United States Patent [19]

Gunn

[11] Patent Number: 4,619,806

[45] Date of Patent: Oct. 28, 1986

[54] METHOD OF FORMING HIGHLY ORIENTED THERMOPLASTIC ARTICLES

[75] Inventor: Charles L. Gunn, Cincinnati, Ohio

[73] Assignee: The Procter & Gamble Company, Cincinnati, Ohio

[21] Appl. No.: 712,042

[22] Filed: Mar. 15, 1985

[51] Int. Cl.$^4$ .............................................. B29C 51/06
[52] U.S. Cl. .................................. 264/522; 264/550; 425/387.1
[58] Field of Search ........................ 264/522, 549–551; 425/387.1, 388

[56] References Cited

U.S. PATENT DOCUMENTS

| | | | |
|---|---|---|---|
| 2,891,280 | 6/1959 | Politis | 18/19 |
| 2,962,758 | 12/1960 | Politis | 18/19 |
| 3,231,642 | 1/1966 | Goldman et al. | 264/25 |
| 3,244,780 | 4/1966 | Levey et al. | 264/89 |
| 3,256,564 | 6/1966 | Welshon | 18/19 |
| 3,470,282 | 9/1969 | Scalora | 264/97 |
| 3,510,913 | 5/1970 | Edwards | 18/19 |
| 3,532,786 | 10/1970 | Coffman | 264/292 |
| 3,546,746 | 12/1970 | Johnson | 18/19 |
| 3,651,186 | 3/1972 | Hall | 264/94 |
| 3,687,594 | 8/1972 | Medendorp | 425/388 |
| 3,757,718 | 9/1973 | Johnson | 113/120 R |
| 3,966,860 | 6/1976 | Hudson et al. | 264/94 |
| 4,059,380 | 11/1977 | Judzis et al. | 425/302.1 X |
| 4,088,718 | 5/1978 | Mulvany, Jr. | 264/25 |
| 4,172,875 | 10/1979 | Beijen et al. | 264/550 |
| 4,256,449 | 3/1981 | Sauer | 425/388 |
| 4,264,852 | 5/1981 | Sauer | 264/512 |
| 4,381,279 | 4/1983 | Jakobsen et al. | 264/522 |
| 4,404,162 | 9/1983 | Miki et al. | 264/550 X |
| 4,420,454 | 12/1983 | Kawaguchi et al. | 264/512 |
| 4,443,401 | 4/1984 | Turner | 264/549 X |

FOREIGN PATENT DOCUMENTS

WO83/01412  4/1983  PCT Int'l Appl. ................ 264/549

OTHER PUBLICATIONS

Quantitative Structural Characterization of the Deformation and Shrinkage of Isotactice Polypropylene Fibers and Films by Robert J. Samuels, Dec. 12, 1972.

*Primary Examiner*—Jan Silbaugh
*Attorney, Agent, or Firm*—Richard C. Witte; John V. Gorman; Ronald J. Snyder

[57] ABSTRACT

A method for forming deep drawn highly oriented thin-walled thermoplastic articles including the steps of planarly supporting a sheet of at least partially crystalline thermoplastic polymeric material and establishing at least one differentially heated area within the sheet. The differentially heated area is to include an outer cool zone having a temperature range generally below the crystalline melt point of the thermoplastic material, a hot zone disposed within the outer zone having a temperature range generally above the crystalline melt point but below the complete melt point of the thermoplastic material, and an inner cool zone located centrally of the hot zone having a temperature range generally below the crystalline melt point of the thermoplastic material. The heated sheet is placed between a female mold unit and a forming mandrel with the inner cool zone generally axially aligned therewith. The mandrel is driven against the inner cool zone of the heated sheet and into the female mold unit so that the thermoplastic material is drawn radially inwardly toward the inner cool zone and around the mandrel forming an elongated generally cylindrical shaped preform having a central cavity. The material is longitudinally stretched a distance sufficient to cause at least a portion of the walls of the preform to undergo strain hardening while the outer cool zone maintains tension control of the sheet material throughout the forming process. The central cavity of the elongated preform is then subjected to internal fluid pressure to radially expand the preform against the interior surface of the female mold cavity. The fluid pressure is maintained for a time sufficient to allow the expanded material to cool and set.

13 Claims, 13 Drawing Figures

METHOD OF FORMING HIGHLY ORIENTED THERMOPLASTIC ARTICLES

TECHNICAL FIELD

This invention relates to a method of forming highly oriented thermoplastic articles from sheet material, and, more particularly, to a method which includes the step of establishing at least one differentially heated area within the sheet material to precisely control the subsequent drawing and blow-molding procedures.

BACKGROUND ART

Much work has been directed to devising improved methods for forming hollow plastic articles and for uniformly distributing the plastic material therewithin. U.S. Pat. No. 3,757,718, which issued to H. G. Johnson on Sept. 11, 1973, for example, discloses a method of forming hollow articles from solid work-strengthenable plastic materials wherein a round blank of plastic is drawn into a cylindrical female die by a forming plunger from above and a cooperating axial plunger from below. Plastic between the forming plungers is thereby drawn out from beneath the lower end of the upper plunger to form the sidewalls of a container as the plunger is advanced into the female die. The cooperating lower plunger acts against the bottom of the plastic blank to control the outflow of material around the outer edge of the upper forming plunger.

U.S. Pat. No. 3,510,913, which issued to B. Edwards on May 12, 1970, concerns a method of manufacturing thin-walled thermoplastic containers with allegedly improved material distribution throughout the containers. The Edwards' method includes heating a web of thermoplastic material to its forming temperature, clamping the web between a forming mandrel and a female mold apparatus, axially advancing the forming mandrel into the female mold thereby forming an elongated intermediate article, then expanding the partially formed article against the inner wall periphery of the female mold. A vacuum within the axially advancing mandrel keeps the heated plastic from contacting the walls of the female mold until the expansion step, and also prevents undesired thinning of the plastic as it is stretched into its elongated preform.

A method for the differential heating and drawing of plastics is disclosed by U.S. Pat. No. 3,244,780, which issued to J. Levey et al. on Apr. 5, 1966. The Levey et al. apparatus includes an upper molding head platen having a centrally located disk portion constructed of a material substantially lower in heat conductivity than the balance thereof. This molding head platen is heated to a predetermined temperature and is lowered into a clamping relationship with a base platen which includes a female molding cavity axially aligned with the central disk of the molding head platen. Thermoplastic sheet material is clamped between two platens and the molding head platen serves to heat the thermoplastic sheet to a desired forming temperature. The portion of the thermoplastic material in contact with the central disk is not heated as much as the surrounding sheet material, thereby forming a cooler central area. Fluid pressure causes the thermoplastic sheet to form a hollow module as the central disk is axially retracted within the molding head platen, then the fluid pressure is reversed to expand the heated plastic material against the interior surfaces of the female cavity of the base platen. The base platen is kept at a cooler temperature and as the heated thermoplastic material comes into contact with the surfaces of the female cavity, further stretching is prohibited by rapid cooling of the material, with the cooler inner portion of the thermoplastic sheet being stretched last.

Another method for forming plastic articles from thermoplastic sheet material is shown in U.S. Pat. No. 4,088,718, which issued to R. F. Mulvaney, Jr. on May 9, 1978. Mulvaney, Jr. contemplates differentially heating a disk of thermoplastic sheet material and establishing concentric temperature zones to control expansion of preselected areas of the material during thermoforming procedures. The circular sheet material is heated such that its outer edge area is hotter than the central area. The heated disk is placed between a pair of opposed platens located between a forming plug and a female mold unit. The forming plug is then driven into the heated plastic sheet drawing it into the female mold unit. The opposed clamping platens are provided with means to adjust the clamping force thereby allowing the plastic sheet to be radially drawn inwardly as the forming plug pushes the plastic material into the female mold. Gradually the clamping means increase their pressure on the plastic sheet so that no part of the outer peripheral edge of the circular plastic disk can be drawn into the aperture of the female mold unit. The forming plug stretches the plastic material to a depth substantially adjacent the lower interior surface of the female mold unit, then pressurized air is introduced to expand the thermoplastic material against the inner surfaces of the female mold. The hotter areas of the plastic disk will expand first and contact the cooler walls of the female mold first, such cooler walls preventing further stretching of the plastic and thereby providing control of the resulting wall thicknesses. As in the Levey et al. process, the cooler central area is stretched last.

U.S. Pat. No. 4,420,454, which issued to Kawaguchi et al. on Dec. 13, 1983, describes a method of making a plastic hollow article quite similar to the Johnson method described above. Kawaguchi et al., however, requires that its plastic material stock be molecularly orientable, of substantially uniform thickness, and heated to a temperature below the upper limit of the molecularly orientable temperatures of the plastic material. Further, Kawaguchi et al. contemplates that the upper and lower forming plungers are to exert a relatively high compressing force on the plastic material stock as they move downwardly at the beginning stage of the forming operation to force the plastic radially outwardly, and thereafter reducing the compressing force to allow the plastic material to be drawn axially. Like Edwards, however, Kawaguchi et al. demonstrates that, as in all solid phase pressure forming methods known heretofore, substantially all the plastic which forms the sidewalls of a container must be obtained from the plastic stock material in the area below the forming plunger.

Despite all of the prior work done in the area of forming plastic articles, there remain problems and traditional limitations on the size and shape of plastic articles which can be formed therefrom. With these previously available forming methods, overall size and shape of a formed article was limited by the fact that effectively only the plastic beneath the plunger was available for the forming operation. Further, with the previously known methods, efficiency of plastic utilization was often forfeited in favor of more uniform wall thicknesses and the prevention of undue thinning in certain areas of the article. Even the use of intricate procedures and complex clamping/forming apparatuses have heretofore been unable to solve all of these problems.

DISCLOSURE OF THE INVENTION

It is an object of this invention to obviate the abovedescribed problems.

It is another object of the present invention to provide a simplified and efficient method for producing thin-walled plastic articles.

It is also on object of the prevent invention to provide a method and apparatus for producing low cost and high quality thin-walled plastic articles.

It is yet another object of the present invention to economically provide a method and apparatus for forming low cost plastic containers which exhibit good strength and performance characteristics.

It is further an object of this invention to provide a simplified method and apparatus which permits the manufacture of a wide variety of container shapes and sizes from a relatively thin plastic sheet.

It is also an object of the present invention to provide an improved method for forming high-quality, low cost, thin-walled plastic containers which is adaptable to high speed forming machinery.

In accordance with one aspect of the present invention, there is provided a method for forming oriented thermoplastic articles which includes the steps of planarly supporting a sheet of at least partially crystalline thermoplastic material and establishing at least one differentially heated area within that sheet. The differentially heated area is to include an outer cool zone having a temperature range below the crystalline melt point of the thermoplastic material, a hot zone which is radially disposed within that outer cool zone and having a temperature range generally above the crystalline melt point but below the complete melt point of the thermoplastic material, and an inner cool zone located centrally of the hot zone and having a temperature range below the crystalline melt point of the thermoplastic material. The heated sheet is placed between a female mold unit and a forming mandrel such that its inner cool zone is axially aligned with the forming mandrel. The forming mandrel drives the heated sheet of thermoplastic material into the female mold unit thereby drawing the sheet material radially inwardly towards its inner cool zone and around the mandrel and forming an elongated generally cylindrical preform having a central cavity. The forming mandrel longitudinally stretches the heated thermoplastic material a sufficient distance to cause at least a portion of the walls of the cylindrical preform to undergo strain hardening, while the outer cool zone maintains tension control of the sheet material throughout this forming process. The central cavity of the cylindrical preform is then subjected to increased internal fluid pressure which radially expands the walls of the preform against the interior surface of the female mold. The internal fluid pressure is maintained for a time sufficient to allow the expanded thermoplastic material to cool and set.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
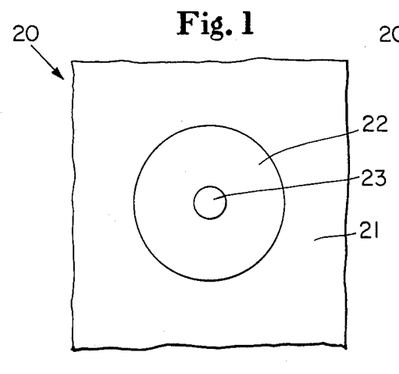
FIG. 1 is a top plan view of a portion of a sheet of differentially heated thermoplastic material as described in the present invention.

Referring now to the drawings in detail, wherein like numerals indicate the same elements throughout the views, a differentially heated or temperature profiled plastic sheet 20 is shown in FIG. 1 as an example of an at least partially crystalline plastic sheet which could be used in the subject process to form a highly oriented thin-walled plastic article.

The process involved herein relies on orientation of the crystalline structure of the plastic during forming to add strength to the resulting article or container. It has been observed that the strength resulting from orientation of the crystalline structure allows thinner-walled containers to feature strength and performance characteristics equivalent to those of non-oriented containers having thicker walls. As used herein, the term "performance characteristics" refers to physical qualities of formed plastic articles such as mass to strength ratios, impact resistance, drop-failure resistance, and the like. In order to achieve orientation, crystalline plastic material must be "worked" or formed at temperatures at which such crystals are present. There are two temperatures characteristic to any particular crystalline polymeric material which are critical to the subject process. The first critical temperature, referred to herein as the "crystalline melt point", is the temperature at which, upon heating the polymer from its crystalline condition, melting of some of the polymer crystals first occurs. The crystalline melt point for any particular polymeric material can be determined by using a differential scanning calorimeter commonly available in the industry. The second critical temperature, referred to herein as the "complete melt point", is a temperature at which, upon heating the polymeric material from its crystalline condition, all of the polymer crystals are melted. Orientatin can not occur when all of the polymer crystals are in a molten state. By maintaining temperatures below the complete melt point, orientation of the polymeric material during the forming process is insured.

As thermoplastic materials are stretched at temperatures below their complete melt point, the cross section of such material at any particular point will be reduced in response to tensile stress (a phenomenon called "necking") until the material reaches its natural draw ratio. The term "draw ratio" refers generally to the ratio of the final linear dimension of the material, after drawing, to the original linear dimension thereof (i.e. the ratio between the length of the drawing stroke and the diameter or average length of the plastic sheet being stretched; generally, the ratio between the depth of the drawing stroke and the diameter of the mold cavity orifice through which the plastic is drawn). The "natural draw ratio" for any particular polymeric material is the draw ratio at which necking is eliminated at any particular point as the material is drawn at a particular temperature. Each particular material has its own natural draw ratio. When elongations of about 200% to 300% are achieved, a phenomenon called "strain hardening" begins to occur to counteract the necking tendencies of thermoplastic materials. Once a material is stretched to its natural draw ratio limit, further elongational strain in any direction will tend to be uniformly distributed throughout the material as a result of strain hardening. The subject process utilizes this characteristic to maximize orientation of the material and to allow mold draw ratios well beyond those possible heretofore by evenly drawing the plastic beyond its natural draw ratio limit prior to blow-molding procedures.

In particular, FIG. 1 shows a portion of a sheet of polymeric material which has been differentially heated in distinctive concentric zones. The thermoplastic sheet 20 comprises an outer cool zone 21 having a temperature range below the crystalline melt point of the thermoplastic material, a hot zone 22 disposed within the outer cool zone 21 having a temperature range generally above the crystalline melt point but below the complete melt point of the thermoplastic material, and an inner cool zone 23 located centrally of the hot zone and having a temperature range below the crystalline melt point. Additional zones (not shown) could also be included as desired (such additional zones shall be discussed in greater detail below).

FIGS. 2–5 illustrate various alternate patterns of differentially heated zones which can be formed within any particular thermoplastic sheet to facilitate the formation of thermoplastic articles having square, oval and other custom shapes (such alternatives to be discussed in greater detail below).

Figure 6:
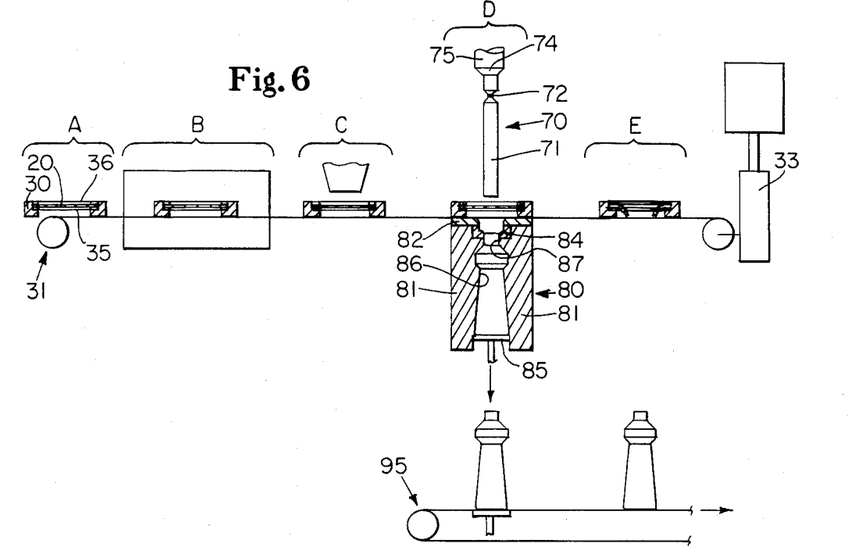
FIG. 6 is a schematic diagram of the method and apparatus of the present invention.

FIGS. 6–13 illustrate the details of the process of the subject invention in which a differentially heated plastic sheet is formed into a highly oriented thin-walled plastic article or container. As shown in FIG. 6, a sheet 20 of plastic material is loaded into a shuttle supporting device 30 at load position A. The material can be any at least partially crystalline thermoplastic polymeric material, such as polypropylene or the like. A preferred material is a homopolymer thermoplastic (sold under the trade name of Boltaron by General Tire, Chemicals & Plastic Division, Newcomerstown, Ohio) having a crystalline melt point of between about 163° C. and about 165° C. (between about 325° F. and about 329° F.) and having a crystallinity of between about 62% and about 70%. The complete melt point of the Boltaron material is approximately 176° C. (350° F.). The sheet of crystalline plastic material is preferably between about 1.6 mm and about 4.8 mm (between about 0.0625 and about 0.1875 inches) in thickness; however, the particular thickness may vary depending upon specific container qualities desired. Problems in adequately establishing and maintaining substantially uniform temperatures in the different zones may be encountered in plastic sheets having thicknesses outside of this preferred range.

The sheet of plastic material 20 is supported within shuttle 30 between a pair of support plates 35 and 36, respectively. Support plates 35 and 36 preferably include heat shields and have openings formed therethrough corresponding to the outer periphery of hot zone 22 to be formed in the plastic sheet. Support plates 35 additionally serves to minimize downward sagging which may result when the plastic sheet is heated to the required temperatures. Shuttle 30 is preferably mounted on a shuttle drive system 31 designed to move the thermoplastic sheet through the forming apparatus. The movement of the shuttle 30 through shuttle system 31 may be timed and sequenced by a central control unit 33. An example of such a control unit is the Texas Instruments 5TI MOD#102-1 controller. Once loaded with the plastic sheet material 20 and its support plates 35 and 36, shuttle 30 is moved to heating station B where at least one differentially heated area will be formed within the thermoplastic sheet 20.

As illustrated in FIG. 1, the differentially heated area is to comprise an outer cool zone 21 having a temperature range generally below the crystalline melt point of the thermoplastic material (i.e. below about 163° C. for the Boltaron material), a hot zone 22 disposed within the outer cool zone having a temperature range generally above the crystalline melt point but below the complete melt point of the thermoplastic material (i.e. above about 163° C. and below about 176° C. for the Boltaron material), and an inner cool zone 23 located centrally vis-a-vis the hot zone 21 and having a temperature range generally below the crystalline melt point. The term "generally" is used with respect to the temperature ranges because there may be some localized temperature deviation within the individual zones which occurs for various reasons which cannot be or are not economically feasibly controlled.

Figure 7:
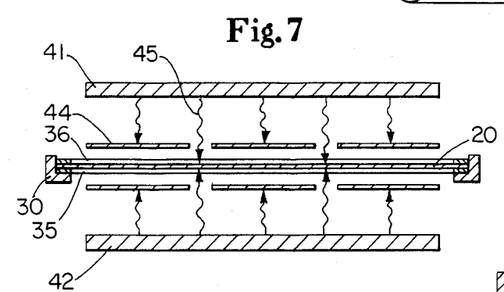
FIG. 7 is a slighly enlarged vertical cross-sectional view of the heating station B shown in FIG. 6.

The means of establishing the differentially heated area within the plastic sheet is not critical, and can be achieved by a number of heating systems commonly available in the industry. An example of a heating device which could advantageously be utilized herein is illustrated in FIG. 7 as comprising a pair of oppositely disposed multi-zone sandwich-type ceramic heater banks 41 and 42 controlled by percentage timers. Similar heating units are commonly available from AAA Thermoforming Company and other sources. Additionally, there could be wire screens or foil reflectors 44 appropriately arranged between the heater banks 41 and 42 to precisely control the amount of energy 45 reaching any particular portion of plastic sheet 20, thereby profiling the temperatures within predetermined zones. In this way, particular zones of plastic sheet 20 may be differentially heated as desired. Shuttle 30 remains in position within heating station B for a sufficient length of time to obtain the desired differential temperature within plastic sheet 20.

When the differentially heated area has been established within sheet 20, shuttle 30 is moved to the temperature monitor station C. At this point the exact temperature within each of the heated zones is carefully checked to insure that the proper temperatures and substantially uniform temperatures have been established. This step can be achieved by a number of thermal monitor equipment systems commonly available in the industry, such as the Inframetrics model 525 thermal imager with Martow band filters. Shuttle 30 need remain at the temperature monitoring station C only long enough for the temperature profiles to be recorded and, thereafter, is moved on to forming station D. This monitoring step could also be eliminated or somehow combined with another step, however, it is preferably included in the process as a means of maintaining uniformity and quality control.

At forming station D, differentially heated thermoplastic sheet 20 is indexed between a female mold unit 80 and a forming mandrel 70, with its inner cool zone 23 generally axially aligned with the central axes thereof.

Figure 8:
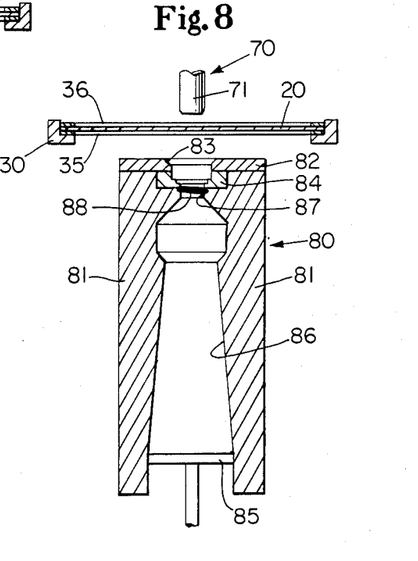
FIG. 8 is a slighly enlarged vertical cross-sectional view of a portion of the molding station D of FIG. 6.

As shown in FIGS. 6 and 8, situated at forming station D are a reciprocating mandrel 70 and a female mold cavity 80 therebelow. Mandrel 70 is designed to axially stretch the thermoplastic sheet 20 into the female mold cavity 80 prior to blow-molding procedures. Mandrel 70 can be formed from a variety of materials such as polypropylene, metal, wood, and the like. Specifically, mandrel 70 comprises a substantially cylindrical shaft 71, blow holes 72, and bottle neck trim area 74. The outside diameter of mandrel 70 is not critical, however, must be designed to telescope into female mold cavity 80 during the forming operations allowing sufficient clearance therewith to stretch thermoplastic sheet 20 into mold cavity 80 without unnecessary interference.

Female mold cavity 80 can be a substantially standard split -mold cavity commonly available in the industry. Mold 80 is shown in the illustrations as comprising mold halves 81, a reciprocable mold bottom 85, neck trim insert 84, and orifice ring 82. Mold halves 81 are formed with bottle-forming surface 86 and bottle finish-forming surface 87. Bottle finish-forming surface 87 can include closure attachment forming means, such as the thread-forming groove 88 shown in several of the drawing figures. As shown in FIG. 6, mold bottom 85 is retractable and illustrates an example of one way in which finished bottles may be removed from the molding system, and, specifically, from shuttle system 31. As will be described below, neck trim insert 84 is designed to interact with the trim portion 74 of mandrel 70 during forming operations to complete the upper portions of bottle 90. Orifice ring 82 is designed to help guide the thermoplastic material of sheet 20 into the female mold cavity 80 as mandrel 70 is driven into mold cavity 80. While not critical to the subject process, the material from which orifice ring 82 is made and the angle at which beveled surface 83 is formed have been found to influence the relative ease with which thermoplastic material of sheet 20 can be radially drawn into mold cavity 80. For example, an orifice ring 82 formed of nylon material and having a beveled surface 83 inclined at a 45 angle from horizontal has been found to function well in the subject process.

Once shuttle 30 properly indexes the differentially heated sheet 20 between mold cavity 80 and mandrel 70, mandrel 70 is driven against inner cool zone 23 of sheet 20 and into female mold cavity 80 thereby drawing the thermoplastic material radially inwardly as the thermoplastic sheet is stretched into mold cavity 80. During this stretching process, outer cool zone 21 serves to maintain tension control of the thermoplastic material without a need for clamping apparatus commonly required heretofore. Hot zone 22 permits substantially uniform drawing of the thermoplastic material, and the maintenance of all temperatures within sheet 20 below the complete melt point allows strain hardening to take place within at least portions of sheet 20 as mandrel 70 stretches the plastic into mold cavity 80. As strain hardening occurs within heated zone 22, additional stretching uniformly draws the plastic in heated zone 22 and inner cool zone 23, and an elongated generally cylindrically shaped preform is formed within mold cavity 80.

It is critical that mandrel 70 longitudinally stretch the thermoplastic sheet 20 a vertical distance sufficient to cause at least a portion of the walls of the resulting preform to undergo strain hardening in order to cause additional stretching to be uniformly distributed as described above. It is preferred that the mandrel stretch the plastic a sufficient distance to cause a substantial portion or substantially all of the walls of the preform to undergo such strain hardening. By insuring uniform drawing of the inner cool zone 23, the usual localized excessive thinning in the cool zone 23 which commonly occurs as a result of its being drawn the furthest distance is avoided. Strain hardening allows the entire elongated preform to be stretched well beyond traditional draw ratio limits without localized thinning and/or material failures, and insures that substantially all of the thermoplastic sheet 20 is drawn and oriented. In particular, as mandrel 70 pushes the heated plastic sheet 20 into female mold cavity 80, the plastic is stretched and pulled in from outer zone 20. It is in this way that additional plastic is provided for forming the container, and so larger draw ratios can be achieved. As mentioned, deep drawing of plastics beyond elongation of about 200% to 300% causes strain hardening to take place.

Because the entire thermoplastic sheet 20 is maintained below its complete melt point temperature, the plastic is oriented as it is stretched and begins to neck down in its warmer areas first. As the natural draw ratio of the plastic is reached in a particular area, strain hardening prevents further necking and causes the remaining areas to be necked down, with the inner cool zone 23 being thinned last. Strain hardening causes substantially the entire plastic preform to be necked down by the mandrel action, and permits subsequent blowing pressure to uniformly stretch the plastic preform to create a highly oriented and uniform thickness container. Because of the resulting more efficient distribution and orientation of the plastic, and because plastic is available from not only the area underneath the forming mandrel but also can be pulled in from outside of the mold orifice, the subject process can achieve mold draw ratios of 4 or 5 to 1, and even higher, and can create deep drawn articles exhibiting equal or greater strength and performance characteristics with less plastic than similar articles formed with forming equipment and procedures known heretofore. Additionally, by obviating a need for clamping apparatus, multi-cavity forming operations within a single sheet of plastic material are facilitated.

The actual relative dimensions of the respective differentially heated zones within plastic sheet 20 may vary according to variables such as desired wall thicknesses, depth of draw required, container size, and the like. A limitation encountered in conventional solid phase forming of sheet materials is that substantially all of the plastic for the article to be molded must come from a billet of plastic initially limited by the area of the mold opening. The geometry is such that even for straight-walled containers, the material has reached its natural extension limit (i.e. the maximum amount of cross-sectional reduction without negative effects on physical material properties has been obtained) when the ratio of the mold depth to the diameter of the mold opening is about 2 to 1. At mold draw ratios of 2 to 1, there is not sufficient plastic available for subsequent expansion into a convoluted bottle mold. By designing the central cool zone 23 to be larger than the mold opening, plastic will be initially drawn radially inward from hot zone 22 outside the mold orifice, and a much greater amount of the plastic sheet can be used; therefore, more plastic will be available for the blowing phase of bottle formation, and bottles having draw ratios of at least 3:1 exhibiting uniform wall thickness and good strength and performance characteristics can be achieved. It is preferred, however, that the outer radial dimensions of cold zone 23 not be greater than two times the radial dimension of the upper orifice of female mold unit 80. In this regard, it has been found that if the outer diameter of cold zone 23 is greater than twice the diameter of the female mold orifice, problems of driving the plastic material into mold cavity 80 may be encountered. By making the cold zone larger than the mold orifice, plastic material will be pulled radially inwardly from the hot zone 22 into the mold cavity 80 because the warmer portions of sheet 20 will be stretched first. This radial drawing of plastic from outside the mold orifice provides additional material from which the walls of a container may be formed.

Figure 9:
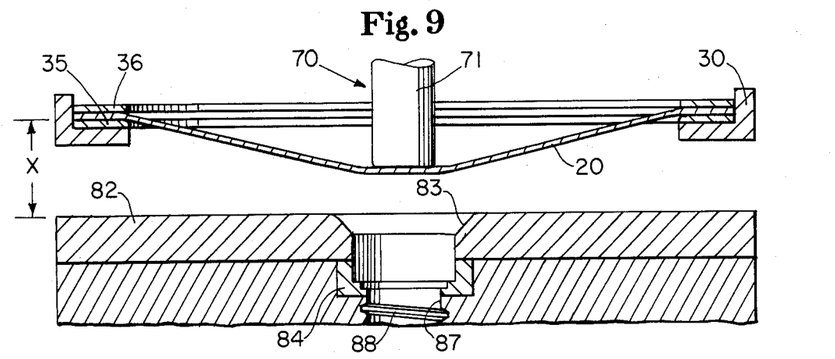
FIG. 9 is an enlarged cross-sectional view illustrating an early stage of the forming process of the present invention wherein the forming mandrel has begun to drive against the differentially heated plastic sheet.
Figure 10:
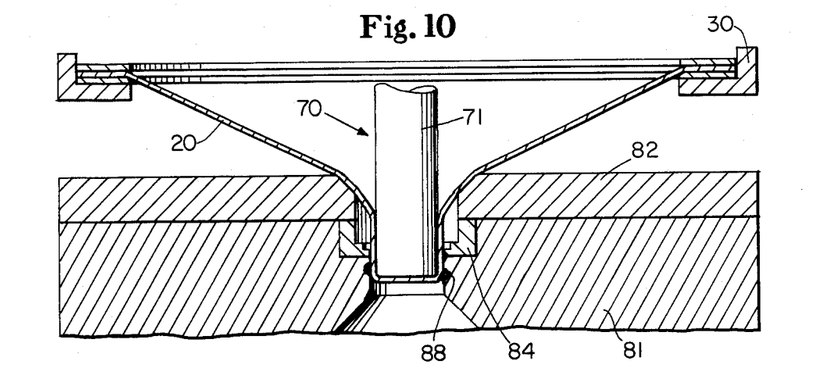
FIG. 10 is an enlarged cross-sectional view illustrating the forming process of the present invention at a point in time subsequent to that illustrated in FIG. 9, and showing the forming mandrel driving the differentially heated plastic sheet into the female mold unit.
Figure 11:
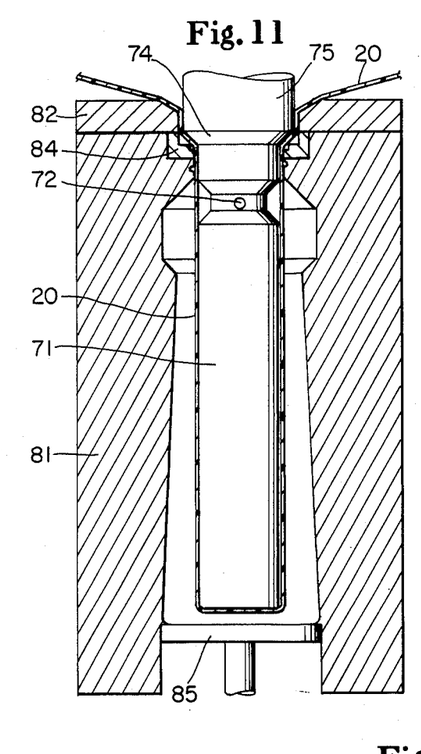
FIG. 11 is a cross-sectional view illustrating the forming process of the present invention at a point in time subsequent to that shown in FIG. 10, and illustrating the forming mandrel at its fully driven position within the female mold.
Figure 12:
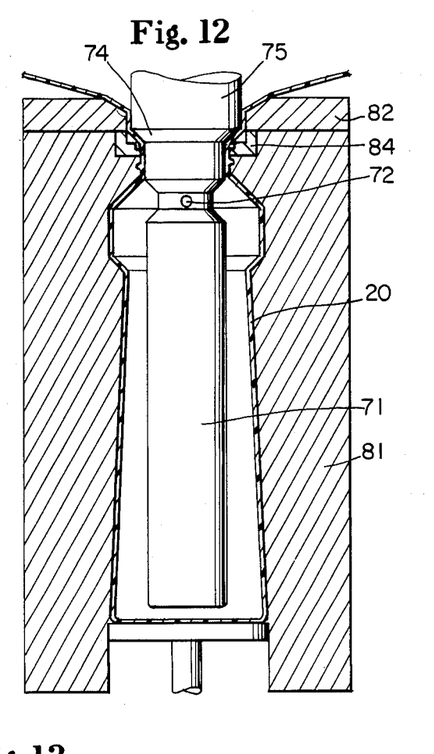
FIG. 12 is a cross-sectional view of the forming process of the present invention at a point in time subsequent to that illustrated in FIG. 11, and showing the thermoplastic material after radial expansion against the interior surface of the female mold.

When mandrel 70 reaches its fully driven position (as shown in FIG. 11), the upper portion of female mold cavity 80 is sealed for blow-molding procedures. The establishment of this upper seal may be accomplished by a variety of ways, however, it is preferred that the upper portions of mandrel 70 include appropriate structure to interact with the upper portions of mold 80 to create such a seal. FIGS. 9 and 10 illustrate mandrel 70 during the early portions of its downward axial movement into mold cavity 80. As shown, mandrel 70 stretches thermoplastic sheet 20 over orifice ring 82 and into the upper portions of mold cavity 80. FIG. 11 illustrates mandrel 70 at its fully driven position within mold cavity 80 and illustrates the sealing action of the upper seal portion 75 of mandrel 70 against plastic sheet 20 and orifice ring 82. FIG. 12 illustrates the blow-molding phase wherein the stretched thermoplastic preform has been expanded against the inner surfaces of mold cavity 80 by blow-molding pressure introduced via blow holes 72.

As pictured in FIGS. 9 and 10, thermoplastic sheet 20 is preferably held some distance above orifice ring 82 to facilitate the radially inward drawing of the plastic material from the peripheral areas of sheet 20. As mentioned, the angle of beveled surface 83 and the material from which orifice ring 72 is made may affect the amount of plastic drawn into female mold cavity 80 during the forming operations. A vertical distance (X) of approximately 2 inches (approximately 51 mm), an orifice angle of approximately 45°, and utilization of nylon as the material for orifice ring 82 has been found to facilitate the inward drawing of the heated plastic into mold cavity 80. Conventional blow-molding pressures (e.g. 80 psi or 5.62 kg/cm$^2$) are sufficient to complete the blow-molding procedure.

Figure 13:
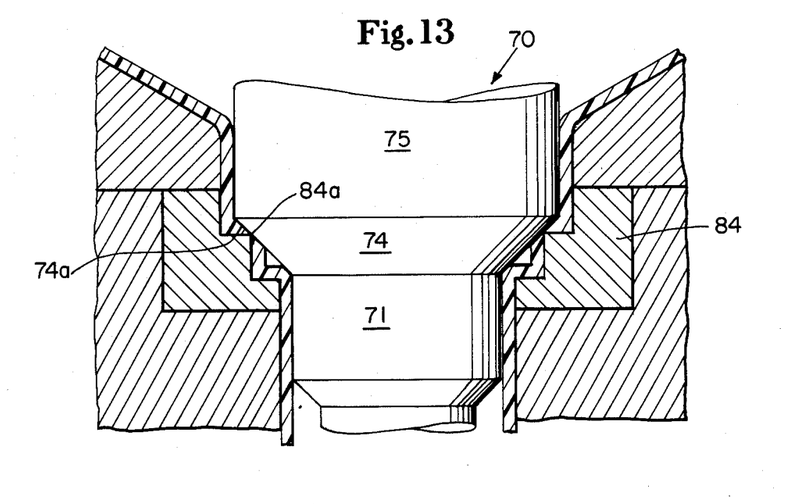
FIG. 13 is an enlarged cross-sectional view of the upper portions of the forming mandrel shown at its trim cut-off position and showing details of a mandrel structure which can be used to seal the mold cavity and trim the upper surfaces of a molded plastic article.

The blow-molding pressure must be maintained for a time period sufficient to allow the expanded thermoplastic material to cool and set. Once the blow-molding procedure has been completed, final bottle neck trimming operations may be undertaken. FIG. 13 illustrates an example of one way of completing such neck trimming operations. Specifically, the trim device 74 of mandrel 70 includes a trim cut-off surface 74a designed to sever excess thermoplastic material when forced against trim cut-off ridge 84a of neck trim insert 84. This procedure can be accomplished by simply axially extending mandrel 70 a slight distance further after the molding procedures have been completed to separate the formed container 90 from the remaining thermoplastic material of sheet 20. Following such trimming operations, female mold 80 may be split apart and the finished container 90 removed therefrom. As shown in FIG. 6, a retractable mold bottom 85 could advantageously serve to facilitate transporting the finished container to subsequent container handling apparatus 95. It should be understood that container 90 could be removed from female mold 80 prior to subsequent neck trimming operations, as the sequence of such procedures is not critical. Following trim operations, shuttle 30 may be moved to station E where scrap plastic can be removed and the shuttle prepared for another forming sequence. Shuttle 30 would, thereafter, return to station A as the process has been explained above. It should be understood that the manner of preparing shuttle 30 for the next forming procedure is not critical to the subject invention and would vary depending on factors such as whether shuttle system 31 was continuous or reciprocating, and other similar variables and preferences.

EXAMPLE

A sheet of Boltoran PRO-5500 having a thickness of approximately 2.28 mm (0.09 inches) was planarly supported within a shuttle device and heated for one minute and 47 seconds within a differential heating device as described above. A hot zone having an outer diameter of approximately 203 mm (approximately 8 inches) was heated to a temperature of approximately 168° C. (335° F.), while a cooler inner zone having an outside diameter of approximately 101 mm (approximately 4 inches) was heated to a temperature of approximately 155° C. (approximately 311° F.). A cool outer zone having a temperature of below 155° C. surrounded the periphery of the hot zone. A mandrel having an outside diameter of approximately 57.15 mm (approximately 2.25 inches) was driven against the differentially heated plastic sheet and into a female mold cavity. The mold cavity had a depth of approximately 279 mm (approximately 11 inches), an inner diameter of approximately 114 mm (approximately 4.5 inches) and an upper orifice diameter of approximately 82.5 mm (approximately 3.25 inches). The heated plastic sheet was stretched into the mold cavity forming an elongated preform having a hollow central cavity and, thereafter, blow-molding pressure of approximately 5.62 kg/cm² (80 psi) radially expanded the preform against the interior surface of the female mold. The bottle resulting from this process had draw ratio of about 3.14 to 1, demonstrated substantially uniform wall thickness in a range of between 9 and 12 mils and showed excellent strength and performance characteristics.

Figure 2:
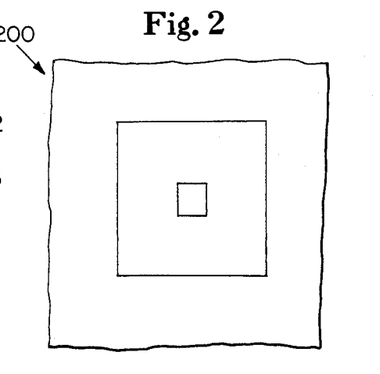
FIGS. 2 through 5 are plan views of portions of differentially heated thermoplastic sheets as described in the present invention featuring alternate patterns of differential heating.
Figure 3:
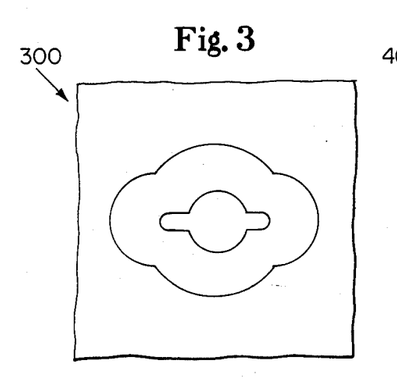
Figure 4:
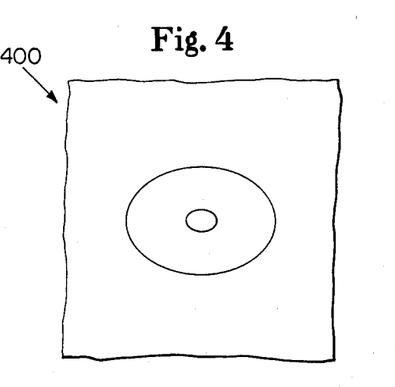
Figure 5:
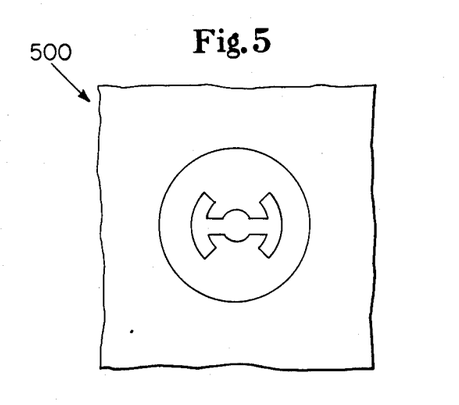

The above example was executed using a thermoplastic sheet having concentric differentially heated zones, as shown in FIG. 1, and utilized a cylindrical mandrel. However, other shapes of containers may require alternate shapes for the respective differentially heated zones within a thermoplastic sheet, and may require mandrels having correspondingly different shapes. For example, FIG. 2 illustrates a thermoplastic sheet 200 which may be used to form a rectangular shaped container. FIGS. 3 and 4 illustrate two other examples of alternate shapes which may be desired. Particular designs for differentially heated zones may also be a result of a need to provide additional plastic in critical areas of a container. FIG. 5 represents an example of a differentially heated sheet 500 which might be used to accommodate specific plastic distribution. It is also contemplated that additional zones (not shown) of differing temperatures might also be used within the hot zone of a particular differentially heated area of a plastic sheet to further finely distribute plastic within a formed container. For example, cooler "spots" or zones within the hot zone could provide additional plastic at critical portions of a container by insuring that such cooler spots are last to be stretched.

Thermoplastic sheet 20 (as well as sheets 200, 300, 400 and 500 of FIGS. 2 through 5) has been described as containing only one differentially heated area for forming a single article. However, the present process can be advantageously utilized to permit multi-cavity formation of a plurality of containers from a single sheet of thermoplastic material having a plurality of differentially heated areas formed therein. In such case, the outer cool zone (i.e. cool zone 21) of each differentially heated area would serve to separate adjacent differentially heated areas from one another without a need for clamping apparatus. It is also conceivable that a plurality of different shaped containers might be simultaneously formed from a single sheet of thermoplastic material simply by heating different portions of the sheet in predetermined differentially heated patterns and aligning the respective areas with corresponding forming stations for molding.

Having shown and described the preferred embodiment of the present invention, further adaptions of the process can be accomplished by appropriate modifications by one of ordinary skill in the art without departing from the scope of the present invention. Several such adaptions have been discussed above. Accordingly, the scope of the present invention should be considered in terms of the following claims and is understood not to be limited to the details of structure and operation shown and described in the specification and drawings.

I claim:

1. A method of forming deep drawn oriented thermoplastic articles comprising the steps:
   (a) planarly supporting a sheet of at least partially crystalline thermoplastic polymeric material;
   (b) establishing at least one differentially heated area within said sheet; said area comprising an outer cool zone having a temperature range generally below the crystalline melt point of the thermoplastic material, a hot zone disposed within said outer cool zone having a temperature range generally above the crystalline melt point but below the complete melt point of the thermoplastic material, and an inner cool zone located centrally of said hot zone and having a temperature range generally below the crystalline melt point of the thermoplastic material;
   (c) placing said heated sheet between a female mold unit and a forming mandrel, said inner cool zone generally axially aligned therewith;
   (d) driving said forming mandrel against the inner cool zone of the heated area of said sheet and into said female mold unit so that said mandrel is first drawn radially inwardly from portions of said hot zone located radially outside of the orifice of said female mold and around said mandrel as it is stretched into said female mold thereby forming an elongated generally cylindrically shaped preform having a central cavity, said forming mandrel longitudinally stretching said material a distance sufficient to cause at least a portion of the walls of said preform to undergo strain hardening, and said outer cool zone maintaining tension control of said sheet material throughout the forming process and permitting the planar support of said sheet material about the periphery of said differentially heated area without clamping the same;
   (e) subjecting said central cavity of said elongated preform to increased internal fluid pressure to radially expand the walls of said preform and force the same against the interior surface of said female mold; and
   (f) maintaining said internal fluid pressure for a time sufficient to allow the expanded material to cool and set.

2. The method of forming oriented thermoplastic articles of claim 1, wherein said outer cool zone and said hot zone comprise circular bands of predetermined width concentrically arranged around a circular inner cool zone.

3. The method of forming oriented plastic articles of claim 1, wherein said outer cool zone and said hot zone comprise substantially rectangular bands of predetermined width concentrically arranged around a substantially rectangular inner cool zone, said inner cool zone and said hot zone having substantially parallel outer boundaries.

4. A method of forming thin-walled highly oriented thermoplastic articles from a sheet of thermoplastic material, comprising the steps:
   (a) planarly supporting a sheet of at least partially crystalline thermoplastic polymeric material;
   (b) establishing at least one differentially heated area within said sheet; said area comprising an outer cool zone having a temperature range generally below the crystalline melt point of the thermoplastic material, a hot zone radially disposed within said outer cool zone having a temperature range generally above the crystalline melt point but below the complete melt point of the thermoplastic material, and an inner cool zone located centrally of said hot zone and having a temperature range generally below the crystalline melt point of the thermoplastic material;

(c) placing said heated sheet between a female mold unit and a forming mandrel, said inner cool zone generally axially aligned therewith;

(d) driving said forming mandrel against the inner cool zone of the heated area of said sheet and into said female mold unit so that said material is first drawn radially inwardly from portions of said hot zone located radially outside of the orifice of said female mold and around said mandrel as it is stretched into said female mold thereby forming an elongated generally cylindrically shaped preform having a central cavity, said forming mandrel longitudinally stretching said material a distance sufficient to cause substantially all of said material forming the walls of said preform to undergo strain hardening, such strain hardening distributing the resulting stretching forces throughout substantially the entire preform, and said outer cool zone maintaining tension control of said sheet material throughout the forming process and permitting the planar support of said sheet material about the periphery of said differentially heated area without clamping the same;

(e) subjecting said central cavity of said elongated preform to increased internal fluid pressure to radially expand the walls of said preform and force the same against the interior surface of said female mold;

(f) maintaining said internal fluid pressure for a time sufficient to allow the expanded material to cool and set;

(g) severing the molded thermoplastic article from the remainder of said thermoplastic sheet; and (h) removing said thermoplastic article from said female mold.

5. The method of forming thin-walled highly oriented thermoplastic articles of claim 4, wherein said outer cool zone and said hot zone comprise circular bands of predetermined width concentrically arranged around a circular inner cool zone.

6. The method of forming thin-walled highly oriented thermoplastic articles of claim 4, wherein said outer cool zone and said hot zone comprise substantially rectangular bands of predetermined width concentrically arranged around a substantially rectangular inner cool zone, the boundaries of said inner cool and said hot zone being substantially parallel to one another.

7. The method of claims 5 or 6, wherein said sheet of thermoplastic material is a homopolymer.

8. The method of claim 7, wherein said sheet of thermoplastic material has a thickness in the range of from about 1.6 mm to about 4.8 mm.

9. The method of claim 8, wherein said outer cool zone has a temperature below about 163° C.; said hot zone has a temperature in the range of from about 163° C. to about 176° C.; and said inner cool zone has a temperature below about 163° C.

10. A method of forming thin-walled highly oriented thermoplastic bottles from a sheet of thermoplastic material, comprising the steps:

(a) planarly supporting a sheet of at least partially crystalline thermoplastic polymeric material on a moveable support structure, said sheet having a thickness in the range of between about 1.6 mm and about 4.8 mm;

(b) establishing at least one differentially heated area within said sheet; said area comprising an outer cool zone having a temperature range generally below the crystalline melt point of the thermoplastic material, a hot zone radially disposed within said outer zone having a temperature range generally above the crystalline melt point but below the complete melt point of the thermoplastic material, and an inner cool zone located centrally of said hot zone and having a temperature range generally below the crystalline melt point of the thermoplastic material;

(c) placing said differentially heated sheet of thermoplastic material between the upper orifice of a female mold unit and below a forming mandrel, said inner cool zone generally axially aligned therewith and having its outer radial dimensions larger than the largest radial dimensions said upper orifice of the female mold unit;

(d) driving said forming mandrel against the inner cool zone of the heated area of said sheet and into said female mold unit so that said material is first drawn radially inwardly from portions of said hot zone located radially outside of the orifice of said female mold and around said mandrel as it is stretched into said female mold, said sheet being drawn over a forming ring adjacent said mold orifice and into said female mold to form an elongated generally cylindrically shaped preform having a central cavity, said forming mandrel longitudinally stretching said material a distance sufficient to cause substantially all of said sheet material forming the walls of said preform to undergo strain hardening such strain hardening distributing the resulting stretching forces throughout substantially the entire preform, and said outer cool zone maintaining tension control of said sheet material throughout the forming process and permitting the planar support of said sheet material about the periphery of said differentially heated area without clamping the same;

(e) subjecting said central cavity of said elongated preform to increased internal fluid pressure to radially expand the walls of said preform and force the same against the interior surface of said female mold;

(f) maintaining said internal fluid pressure for a time sufficient to allow the expanded material to cool and set;

(g) severing the molded thermoplastic bottle from the remainder of said thermoplastic sheet; and (h) removing said thermoplastic bottle from said female mold.

11. The method of forming thin-walled highly oriented thermoplastic articles of claim 10, wherein said outer cool zone and said hot zone comprise circular bands of predetermined width concentrically arranged around a circular inner cool zone.

12. The method of forming thin-walled highly oriented thermoplastic articles of claim 10, wherein said outer cool zone and said hot zone comprise substantially rectangular bands of predetermined width concentrically arranged around a substantially rectangular inner cool zone, the boundaries of said inner cool and said hot zone being substantially parallel to one another.

13. The method of claims 11 or 12, wherein said sheet of thermoplastic material is polypropylene.

* * * * *